(No Model.)
E. THEISEN.
EVAPORATING AND COOLING APPARATUS.
No. 444,945. Patented Jan. 20, 1891.
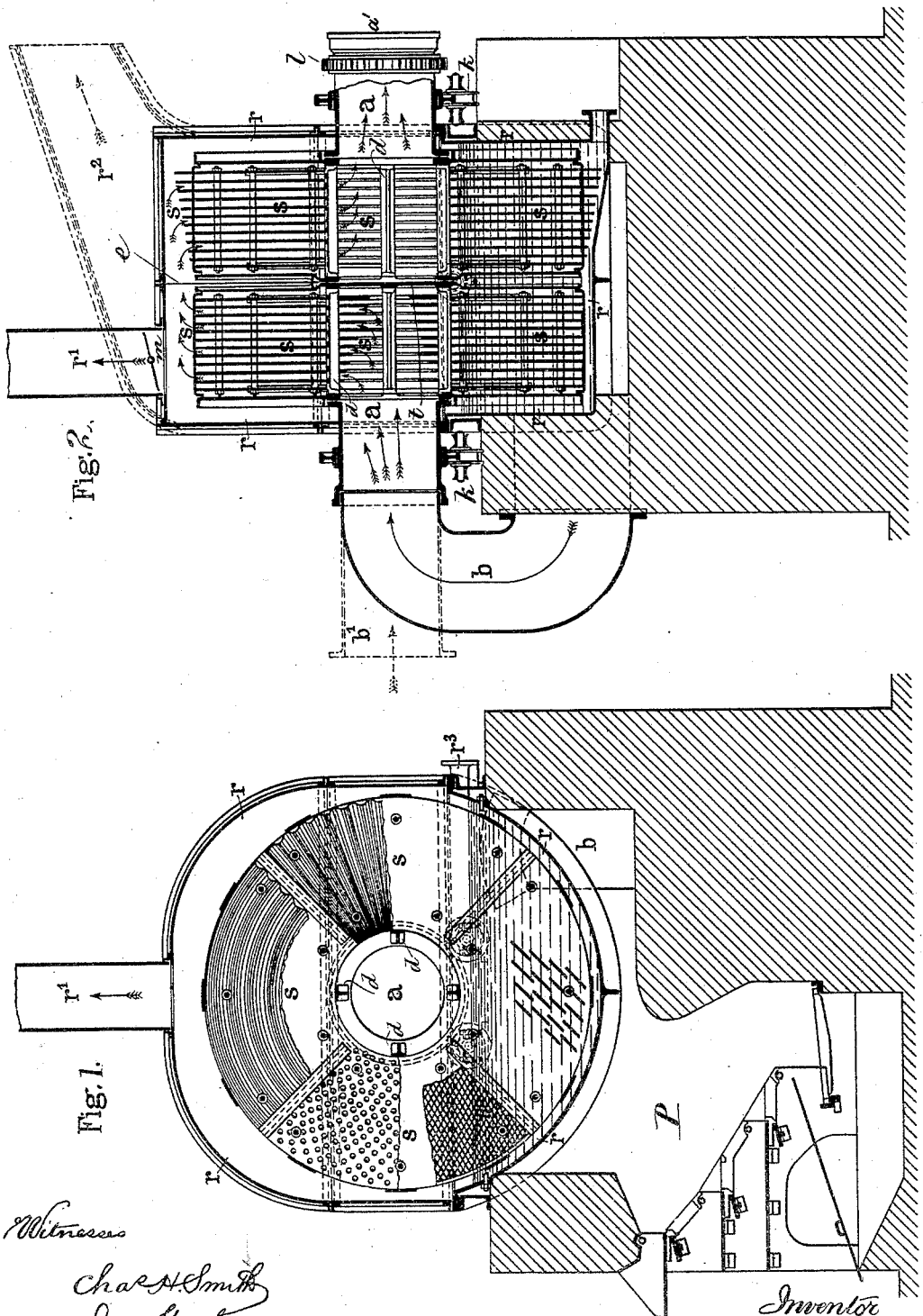

UNITED STATES PATENT OFFICE.

EDUARD THEISEN, OF COLOGNE, GERMANY.

EVAPORATING AND COOLING APPARATUS.

SPECIFICATION forming part of Letters Patent No. 444,945, dated January 20, 1891.

Application filed February 17, 1888. Serial No. 264,332. (No model.) Patented in Germany October 25, 1883, No. 28,241, and in France March 11, 1884, No. 160,851.

*To all whom it may concern:*

Be it known that I, EDUARD THEISEN, of Cologne, Germany, have invented an Improvement in Evaporating and Cooling Apparatus, of which the following is a specification, and which has been patented in Germany October 25, 1883, No. 28,241, and in France, March 11, 1884, No. 160,851, and partly patented to me in Germany by additional patent (Zusetz patent) No. 42,577, July 8, 1887, and in France by certificate of addition to Patent No. 160,851, of August 1, 1887.

This invention refers to apparatus for evaporating and cooling purposes, and has for its object to afford means to raise the liquid to be evaporated or cooled by means of disks and to cause a stream of heated or cold air or of hot products of combustion to pass through the disks from the center part to the periphery, and in a reverse direction so as to act in a most efficaceous manner on the liquid to be evaporated or to be cooled. As to the apparatus used for this purpose I employ one in which smooth or undulated, full or perforated disks are used in groups and rotated within vessels with trough or wave shaped or with smooth or undulated bottom or side walls, so as to expose the liquid materials to the action of the currents of air or gases. The stream of heat may come from or consist of the exit gases of a hearth or furnace under the said vessels, and the heat of which hearth acts in the first instance through the bottom or side walls of the vessel on the liquid to be evaporated, but which heat in the second instance acts on the same liquid by passing through or between the disks. The hot gases may, however, be conducted and admitted into the apparatus from any other source whatever. The hot gases, from whatever source they come in the two groups of disks, are conducted between the disks, and these hot gases are conducted from the center of the disks to the periphery and from the periphery of the disks to the center, the purpose of these alternative arrangements being to make the utmost use possible of the heat in the smallest compass or space for evaporating purposes, or, as the case may be, for heating or cooling purposes.

This invention will be more fully understood by reference to the annexed drawings, in which—

Figure 1 is a cross-section, and Fig. 2 is a longitudinal section, of an apparatus for the above-named purposes.

The disks $s$ rotate within the vessel $r$, which is provided with trough-shaped bottom, the vessel $r$ being supplied with the liquid to be evaporated. The disks are mounted upon a hollow axle or cylinder $a$, which forms the end or part of the flue $b$ for the heated gases. The axle or cylinder $a$ is closed at the side opposite to the entrance of the air or gases, but is perforated on its circumference for the gases or air to flow through and between the disks to the upper aperture $r'$ of the vessel $r$. Through this aperture the air or gases with the products of evaporation may escape directly into the chimney.

The disks $s$ are arranged in two groups within the vessel $r$, the groups being separated by partition $e$ from each other in such a manner that the air or gases admitted at $b$ into the axle $a$ will pass the first group of disks from center to periphery, and thereafter through the second group of disks from periphery to center, and to escape here through the axle $a$, open at one end $a'$. The gases may from here be conducted to a second or third or more apparatus provided with similar groups of disks for the complete use of the air or gases employed. The groups of disks $s$ may be combined with or connected to the axle $a$ by parallel longitudinal bars $d$, which pass through or are connected with the disks at their inner edges, the disks being cut out at their center part so that the air or gases admitted may find no hinderance whatever in its passage between the disks.

In order to cause the air or gases to be divided or to enter as uniformly as possible between all the disks these disks of the first group may be cut out with successively smaller central holes, so that the central opening has a conical shape, and the disks of the second group should increase in diameter at the periphery, so as to catch the stream of air or gas as uniformly as possible at all the divisions, as illustrated in Fig. 2, there being a partition at $t$ in the cylindrical axle.

The axle or cylinder $a$ may be carried by rollers $k$ or revolving disks and may be rotated by any suitable device, such as a gear-wheel, as shown at $l$.

The products of evaporation may be carried away or led off by the tube $r'$ or $r^2$, Fig. 2, if desired, by opening the damper $m$.

The vessel $r$ is supplied by a pipe $r^3$ with the liquid to be evaporated.

The disks $s$ for raising the liquid may be provided either with concentric or radial undulations or with perforations, or made of netting or with blades placed in proper position so as to increase the surface of the liquid which is to be exposed to the stream of air or gases. Some of these different forms, which may be varied at will, are indicated in Fig. 1; but I do not limit myself to any particular character of disks.

In the apparatus illustrated, the hearth or combustion-chamber P is shown as directly below the vessel $r$, so that the combustion acts directly on the bottom of the vessel, and thereafter the products of this combustion enter between the disks. In the treatment of liquids which cannot be exposed to the direct contact with the products of combustion the heat must be taken from any other source, and in such instance it may be admitted into the apparatus by tube $b'$. (Indicated in dotted lines in Fig. 2.) I, however, prefer to allow such heat from any other source to first act upon the bottom of the vessel $r$, and thereafter enter between the disks.

It is obvious that the apparatus specified may be used for cooling liquid or for cooling heated air by its repeated and thorough contact with cool liquid.

In order to increase the action of the apparatus, the heated or cool air may be driven in by a fan or the end of the apparatus, or, if more than one apparatus is used, they may be provided with an exhauster to increase the velocity of the passing stream of air or gases. It may in some cases be advisable to surround the upper part of vessel $r$ with a non-conducting material or with brick-work, so as to keep away any injurious atmospheric influence.

I claim as my invention—

The combination, with the vessel to contain the liquid to be acted upon, of a group of disks with the central openings diminishing in size, and a second group of disks successively of larger diameter, and a partition between the groups, substantially as set forth.

In testimony that I claim the foregoing as my invention I have signed my name in presence of two subscribing witnesses.

EDUARD THEISEN.

Witnesses:
PAUL DRUCKMÜLLER,
WILHELM WIESENHÜTTER.